(12) United States Patent
Winger et al.

(10) Patent No.: US 7,233,622 B2
(45) Date of Patent: Jun. 19, 2007

(54) REDUCED COMPLEXITY EFFICIENT BINARIZATION METHOD AND/OR CIRCUIT FOR MOTION VECTOR RESIDUALS

(75) Inventors: Lowell L. Winger, Waterloo (CA); Eric C. Pearson, Conestogo (CA)

(73) Assignee: LSI Corporation, Milpitas, CA (US)

( * ) Notice: Subject to any disclaimer, the term of this patent is extended or adjusted under 35 U.S.C. 154(b) by 791 days.

(21) Appl. No.: 10/639,338

(22) Filed: Aug. 12, 2003

(65) Prior Publication Data

US 2005/0036551 A1    Feb. 17, 2005

(51) Int. Cl.
*H04N 7/12*    (2006.01)
*H03M 7/00*    (2006.01)

(52) U.S. Cl. .................. 375/240.16; 341/107

(58) Field of Classification Search .......... 375/240.16, 375/240.02, 240.26; 709/246; 341/107, 341/51, 50; 348/416.1
See application file for complete search history.

(56) References Cited

U.S. PATENT DOCUMENTS

| | | | |
|---|---|---|---|
| 5,025,258 A | 6/1991 | Duttweiler | 341/107 |
| 5,099,440 A | 3/1992 | Pennebaker et al. | 364/554 |
| 5,729,690 A * | 3/1998 | Jeong et al. | 709/246 |
| 5,905,535 A | 5/1999 | Kerdranvat | 348/416 |
| 6,014,186 A * | 1/2000 | Kim | 375/240.26 |
| 6,900,748 B2 * | 5/2005 | Marpe et al. | 341/107 |
| 6,917,310 B2 * | 7/2005 | Pearson et al. | 341/50 |
| 6,927,710 B2 * | 8/2005 | Linzer et al. | 341/107 |

* cited by examiner

*Primary Examiner*—Gims Philippe
(74) *Attorney, Agent, or Firm*—Christopher P. Maiorana PC

(57) ABSTRACT

An apparatus comprising a first processing circuit and a second processing circuit. The first processing circuit may be configured to generate a motion vector residual in response to one or more macroblocks of an input signal. The second processing circuit may be configured to convert between (i) the motion vector residual and (ii) a binarized representation of the motion vector residual. The binarized representation of the motion vector residual generally comprises (i) a binarized representation of an absolute value of the motion vector residual and (ii) a binarized representation of a sign of the motion vector residual when the motion vector residual has a non-zero value. The binarized representation of the sign is generally located after an end of the binarized representation of the absolute value of the motion vector residual.

20 Claims, 8 Drawing Sheets

REDUCED COMPLEXITY EFFICIENT BINARIZATION METHOD AND/OR CIRCUIT FOR MOTION VECTOR RESIDUALS

FIELD OF THE INVENTION

The present invention relates to a digital video generally and, more particularly, to a method and/or circuit for implementing reduced complexity efficient binarization for motion vector residuals.

BACKGROUND OF THE INVENTION

Conventional digital video encoders and decoders have problems implementing efficient conversion. In particular, efficient conversion from a motion vector difference (MVD) into a binarized representation appropriate for input to a binary arithmetic encoder for compression of the motion vector difference is difficult with conventional decoders. In particular, most conventional approaches separate the binarization of the absolute value of the motion vector difference from the binarization of the sign of the motion vector difference. Different contexts (i.e., statistical assumptions) apply for efficient entropy encoding of the absolute value and the sign.

A first conventional approach binarizes and encodes the sign only for non-zero motion vector differences (MVD). Such an approach puts the sign bit after the first bit of the MVD. The presence or absence of the sign bit can be inferred immediately from the value of the MVD.

Such an approach has the disadvantage that parsing of the absolute value of the MVD is interrupted for the parsing of the sign bit. Such parsing potentially increases the complexity of the binarization and de-binarization processes. Such an approach was implemented in the software version of the H.264 standard in order to get the best possible bitrate, regardless of parsing complexity.

Another conventional approach binarizes and always encodes the sign bit (even for zero motion vector differences) Such an approach places the sign bit after the entire binarization of the absolute value of the MVD. The parsing of the absolute value of the MVD is not interrupted by the parsing of the sign bit.

Such an approach has the disadvantage that extra bits must be sent in the compressed bitstream. Such an approach was described in the JVT-F100draft2b of the H.264 standard specification in order to get the least possible complexity in the binarization process.

It would be desirable to implement a system that (i) only binarizes the sign for non-zero MVDs and (ii) places the sign binarized (if it is coded) after the end of the binarization of the absolute value of the MVD.

SUMMARY OF THE INVENTION

The present invention concerns an apparatus comprising a first processing circuit and a second processing circuit. The first processing circuit may be configured to generate a motion vector residual in response to one or more macroblocks of an input signal. The second processing circuit may be configured to convert between (i) the motion vector residual and (ii) a binarized representation of the motion vector residual. The binarized representation of the motion vector residual generally comprises (i) a binarized representation of an absolute value of the motion vector residual and (ii) a binarized representation of a sign of the motion vector residual when the motion vector residual has a non-zero value. The binarized representation of the sign is generally located immediately following the binarized representation of the absolute value of the motion vector residual.

The objects, features and advantages of the present invention include providing a method and/or circuit for efficient binarization for motion vector residuals that may (i) efficiently compress a bitstream, (ii) binarize the sign only for non-zero MVDs, (iii) place the binarized sign, (iv) prevent intermingling of the binarization of the absolute value and the sign of the MVDs, and/or (v) simultaneously achieve a low-complexity binarization and an efficiently compressed bitstream (since the sign is only encoded when needed).

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally focuses on binarizing the sign for non-zero MVDs. The binarized sign may be placed (if coded) immediately following the binarization of the absolute value of the MVD. In general, no intermingling of the binarizations of the absolute value and of the sign of the MVDs occurs, since binarization of the sign only occurs for non-zero MVDs. The present invention may simultaneously achieve (i) a low-complexity binarization and (ii) an efficiently compressed bitstream (since the sign is only encoded when needed). The present invention may be implemented in the context of an H.264 encoder and/or decoder. However, the present invention may also be used in any video encoding standard using context adaptive binary arithmetic encoding.

Figure 1:
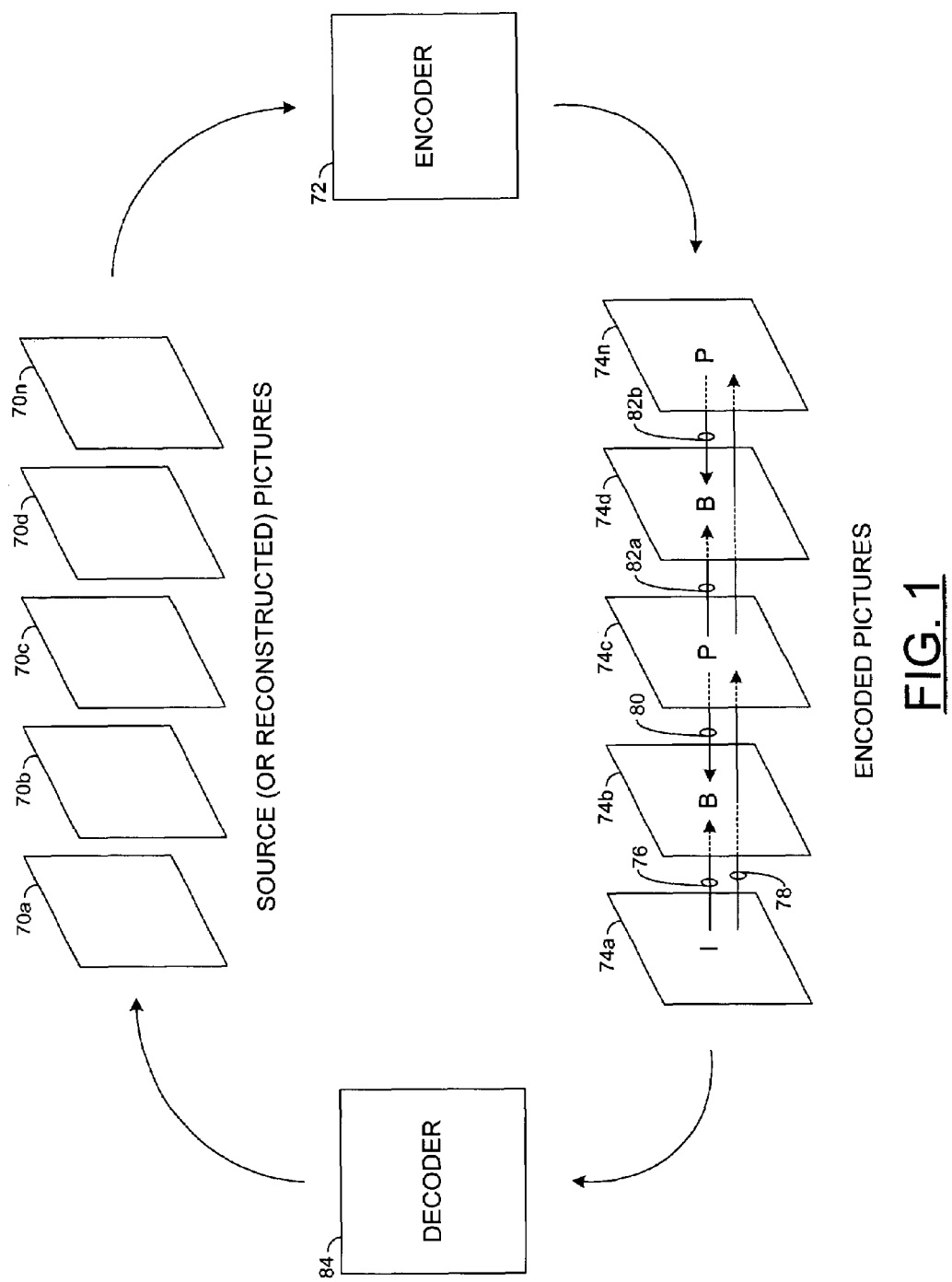
FIG. 1 is a block diagram illustrating encoding and decoding operations.

Referring to FIG. 1, a block diagram is shown illustrating encoding and decoding operations. In general, a data stream (e.g., a video stream) may comprise a series of source pictures $70a$–$n$. The source pictures may also be referred to as images, frames, a group-of-pictures (GOP) or a sequence. The pictures generally comprise contiguous rectangular arrays of pixels (i.e., picture elements). Compression of digital video without significant quality degradation is usually possible because video sequences contain a high degree of: 1) spatial redundancy, due to the correlation between neighboring pixels, 2) spectral redundancy, due to correlation among the color components, 3) temporal redundancy, due to correlation between video frames, and 4) psychovisual redundancy, due to properties of the human visual system (HVS).

Video frames generally comprise three rectangular matrices of pixel data representing a luminance signal (e.g., luma Y) and two chrominance signals (e.g., chroma Cb and Cr) that correspond to a decomposed representation of the three primary colors (e.g., Red, Green and Blue) associated with each picture element. The most common format used in video compression standards is eight bits and 4:2:0 sub-sampling (e.g., the two chroma components are reduced to one-half the vertical and horizontal resolution of the luma component). However, other formats may be implemented to meet the design criteria of a particular application.

Each picture may comprise a complete frame of video (e.g., a frame picture) or one of two interlaced fields from an interlaced source (e.g., a field picture). The field picture generally does not have any blank lines between the active lines of pixels. For example, if the field picture is viewed on a normal display, the field picture would appear short and fat. For interlaced sequences, the two fields may be encoded together as a frame picture. Alternatively, the two fields may be encoded separately as two field pictures. Both frame pictures and field pictures may be used together in a single interlaced sequence. High detail and limited motion generally favors frame picture encoding. In general, field pictures occur in pairs (e.g., top/bottom, odd/even, field1/field2). The output of a decoding process for an interlaced sequence is generally a series of reconstructed fields. For progressive scanned sequences, all pictures in the sequence are frame pictures. The output of a decoding process for a progressive sequence is generally a series of reconstructed frames.

The source pictures $70a-n$ may be presented to an encoder 72. The encoder 72 may be configured to generate a series of encoded pictures $74a-n$ in response to the source pictures $70a-n$, respectively. For example, the encoder 72 may be configured to generate the encoded pictures $74a-n$ using a compression standard (e.g., MPEG-2, MPEG-4, H.264, etc.). In general, encoded pictures may be classified as intra coded pictures (I), predicted pictures (P) and bi-predictive pictures (B). Intra coded pictures are generally coded without temporal prediction. Rather, intra coded pictures use spatial prediction within the same picture. For example, an intra coded picture is generally coded using information within the corresponding source picture (e.g., compression using spatial redundancy). An intra coded picture is generally used to provide a receiver with a starting point or reference for prediction. In one example, intra coded pictures may be used after a channel change and to recover from errors.

Predicted pictures (e.g., P-pictures or P-frames) and bi-predictive pictures (e.g., B-pictures or B-frames) may be referred to as inter coded. Inter coding techniques are generally applied for motion estimation and/or motion compensation (e.g., compression using temporal redundancy). P-pictures and B-pictures may be coded with forward prediction from references comprising previous I and P pictures. For example, the B-picture 74b and the P-picture 74c may be predicted using the I-picture 74a (e.g., as indicated by the arrows 76 and 78, respectively). The B-pictures may also be coded with (i) backward prediction from a next I or P-reference picture (e.g., the arrow 80) or (ii) interpolated prediction from both past and future I or P-references (e.g., the arrows 82a and 82b, respectively). However, portions of P and B-pictures may also be intra coded or skipped (e.g., not sent at all). When a portion of a picture is skipped, the decoder generally uses the associated reference picture to reconstruct the skipped portion with no error.

However, the concept of what particular pictures may reference what other particular pictures may be generalized in a particular compression standard (e.g., H.264). For example, P-pictures may reference temporally forward or backward. B-pictures may have similar forward or backward references. The restriction is generally not time, but rather how many frames are stored in a buffer so that the frames may be decoded in a different order than the frames are displayed. In one example, the frames may be referenced forward in time. In another example, the frames may be referenced backward in time (e.g., re-ordering the frames).

In one example, a B-frame may differ from a P-frame in that a B-frame may do interpolated prediction from any two reference frames. Both reference frames may be (i) forward in time, (ii) backward in time, or (iii) one in each direction. B-pictures can be, and are expected to often be, used as prediction references in H.264. In many cases an important distinction is between reference and non-reference frames.

The encoded pictures $74a-n$ may be presented to a decoder 84. The decoder 84 is generally configured to generate a series of reconstructed pictures corresponding to the source pictures $70a-70n$ (e.g., images, frames, fields, etc.) in response to the encoded pictures. In one example, the decoder 84 may be implemented within the encoder 72 and the reconstructed pictures may be used in the prediction operations of the encoding process.

Figure 2:
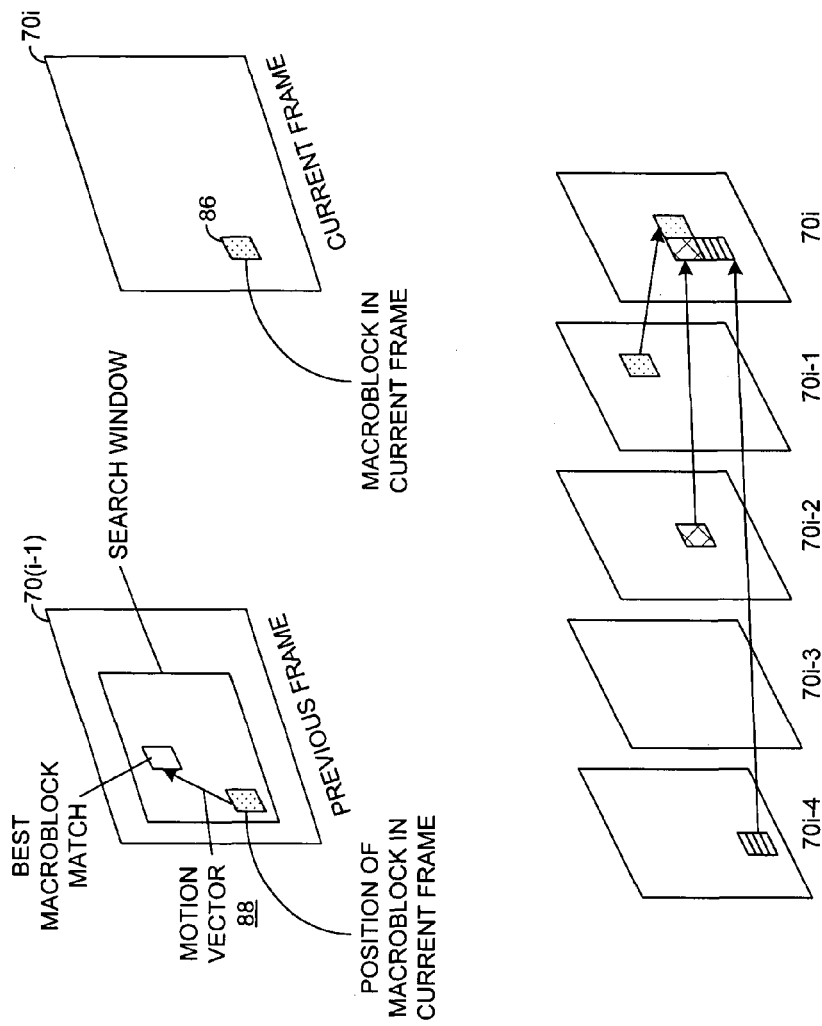
FIG. 2 is a block diagram illustrating example prediction operations.

Referring to FIG. 2, a block diagram is shown illustrating example prediction operations. A picture (or video frame) 70i may be divided into a number of macroblocks 86 of equal size. In one example, the macroblocks 86 may be implemented as 16×16 pixels. However, other size macroblocks may be implemented to meet the design criteria of a particular application. Motion compensated prediction generally presumes that a macroblock within the current picture 70i may be modeled as a translation of a macroblock from a previous picture $70(i-1)$. Each macroblock 86 in the current picture 70i is generally predicted from the previous picture $70(i-1)$. The motion information is generally represented as a two-dimensional displacement vector or motion vector 88. Due to the block-based picture representation, motion estimation generally uses block-matching techniques that obtain the motion vector by minimizing a cost function measuring the mismatch between a candidate block and the current block. In one example, a number of previous (or reference) pictures $70(i-4), 70(i-3) \ldots 70(i-1)$ may be used to predict the macroblocks in the current picture 70i.

Figure 3:
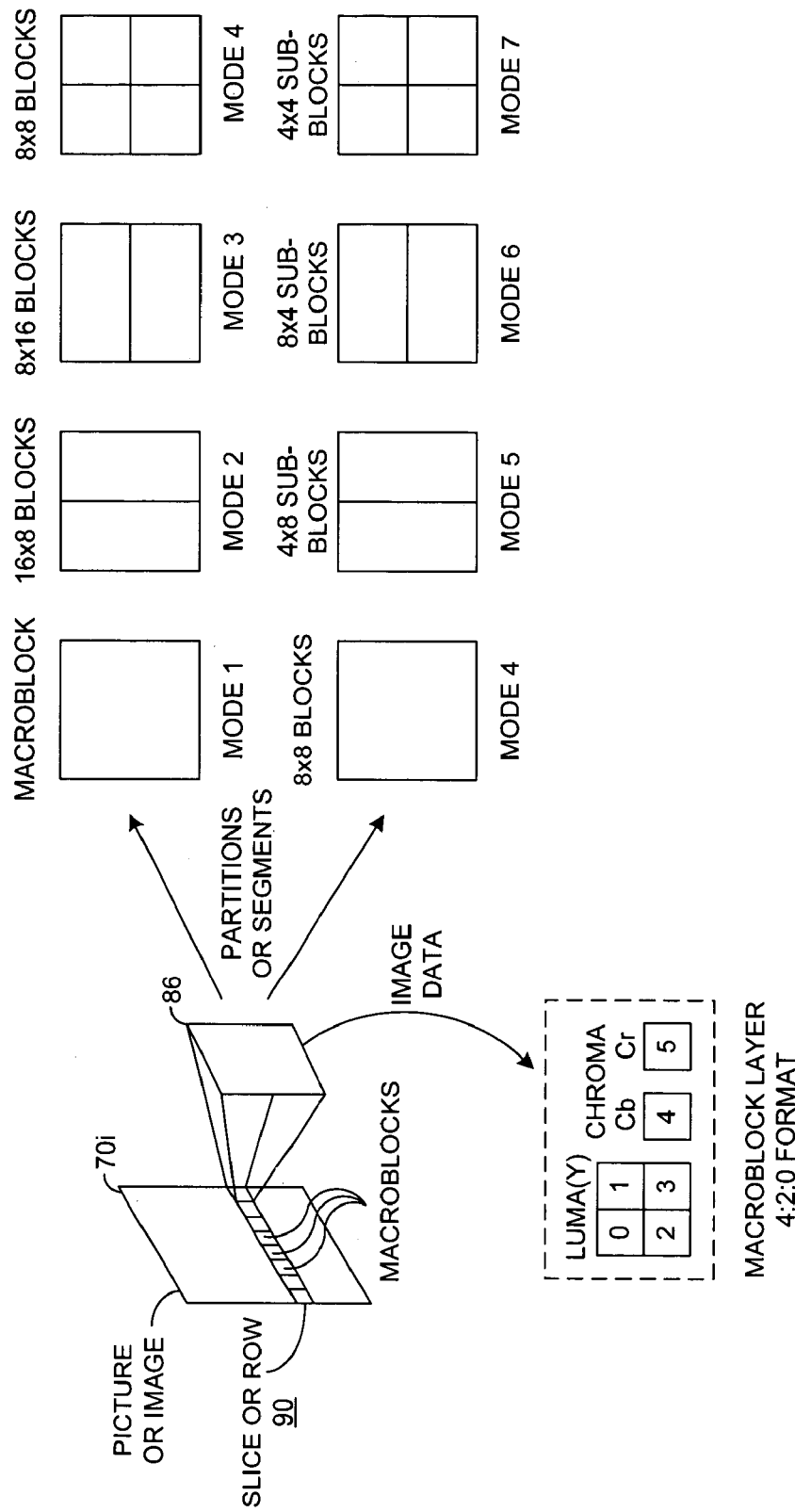
FIG. 3 is a block diagram illustrating partitions or segments of pictures.

Referring to FIG. 3, a block diagram is shown generally illustrating partitions or segments of pictures. In general, a picture (e.g., an image, a frame, a field, etc.) 70i may be divided (e.g., segmented, partitioned, etc.) into a number of macroblocks 86. The macroblocks generally comprise an array of pixels having vertical and horizontal dimensions of equal size (e.g., 32×32, 16×16, etc). The macroblocks generally comprise luminance data (e.g., luma Y) and chrominance data (e.g., blue chroma Cb and red chroma Cr). In one example, the luminance data may have a resolution that is twice that of the chrominance data (e.g., a 4:2:0 format).

The macroblocks 86 may be grouped in a number of slices 90. The slices 90 may comprise an arbitrary number of macroblocks 86. The slices 90 generally run from left to right and may comprise an entire row of the picture 70i. However, a slice 90 may comprise less than or more than an entire row of macroblocks 86 (e.g., H.264 compliant). In one example, a slice 90 may be defined as a particular number of macroblocks 86 grouped together. For broadcast profiles, the macroblocks 86 in a slice 90 are generally consecutive macroblocks in raster scan order. However, for streaming and/or video-conferencing applications, a map may be sent identifying which scattered macroblocks are grouped together in a slice. A compression standard (e.g., H.264) may also provide an option of using macroblocks or macroblock pairs. A macroblock pair comprises two macroblocks located one above the other. When macroblock pairs are used, a slice or row generally comprises macroblock pairs rather than macroblocks.

In one example, the macroblock 86 may be implemented as a 16×16 block. The macroblock 86 may be encoded in an inter prediction mode (e.g., compression based upon temporal redundancy) or an intra prediction mode (e.g., compression based upon spatial redundancy). In the inter prediction mode, each 16×16 macroblock 86 may be predicted with a single 16×16 vector (e.g., mode 1). Alternatively, the macroblock 86 may be segmented into two 16×8 blocks (e.g., mode 2) or two 8×16 blocks (e.g., mode 3), in which case two motion vectors may be generated for predicting the macroblock 86. The macroblock 86 may also be segmented into four 8×8 blocks (e.g., mode 4), in which case four motion vectors may be generated for the macroblock 86. When the macroblock 86 is segmented into the four 8×8 blocks (e.g., mode 4), each 8×8 block may be optionally further segmented into two 4×8 sub-blocks (e.g., mode 5), two 8×4 sub-blocks (e.g., mode 6) or four 4×4 sub-blocks (e.g., mode 7). An encoder generally decides which "mode" to use for encoding each macroblock 86. For example, an error score may be computed based on a closeness of match determination for each mode, with the modes that use more vectors being penalized (e.g., by increasing the respective error score) because of the additional bits that it will take to encode the motion vectors.

For chrominance (or chroma) samples, the prediction block is generally formed for the entire 8×8 chroma block. Both chroma Cb and chroma Cr blocks are generally processed similarly. In general, one of four prediction modes may be used (e.g., DC or mode 0, vertical or mode 1, horizontal or mode 2, and plane or mode 3).

Figure 4:
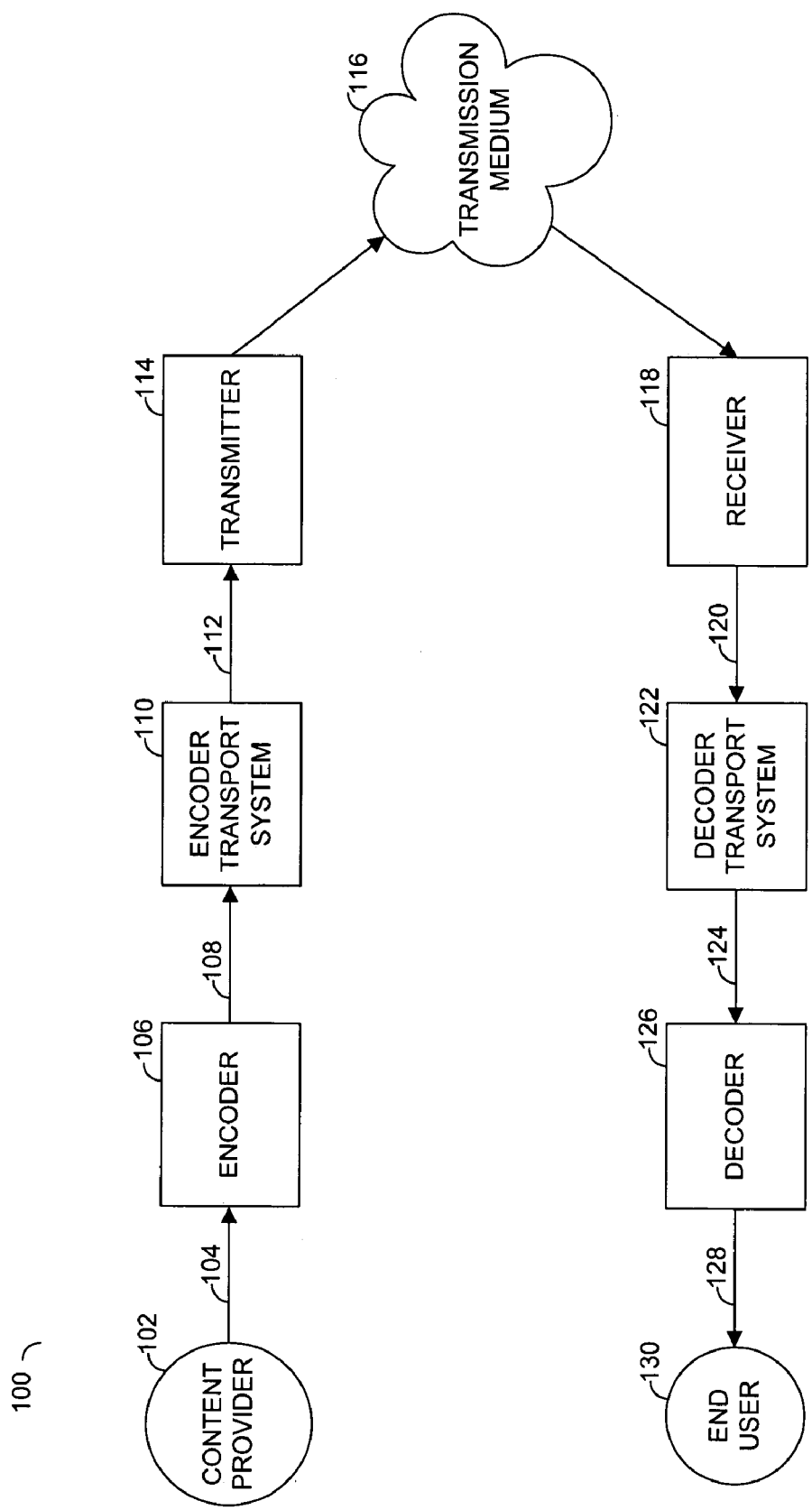
FIG. 4 is a block diagram illustrating various components of a compressed video system.

Referring to FIG. 4, a block diagram of a system 100 is shown. In general, a content provider 102 presents video image, audio or other data 104 to be compressed and transmitted to an input of an encoder 106. The compressed data 108 from the encoder 106 may be presented to an encoder transport system 110. An output of the encoder transport system 110 generally presents a signal 112 to a transmitter 114. The transmitter 114 transmits the compressed data via a transmission medium 116. The content provider 102 may comprise a video broadcast, DVD, or any other source of video data stream. The transmission medium 116 may comprise a broadcast, cable, satellite, network, DVD, hard drive, or any other medium implemented to carry, transfer, and/or store a compressed bitstream.

On a receiving side of the system 100, a receiver 118 generally receives the compressed data bitstream from the transmission medium 116. The receiver 118 presents a bitstream 120 to a decoder transport system 122. The decoder transport system 122 generally presents the bitstream via a link 124 to a decoder 126. The decoder 126 generally decompresses the data bitstream and presents the data via a link 128 to an end user 130. The end user 130 may comprise a television, monitor, computer, projector, hard drive, or any other medium implemented to carry, transfer, present, display and/or store an uncompressed bitstream.

Figure 5:
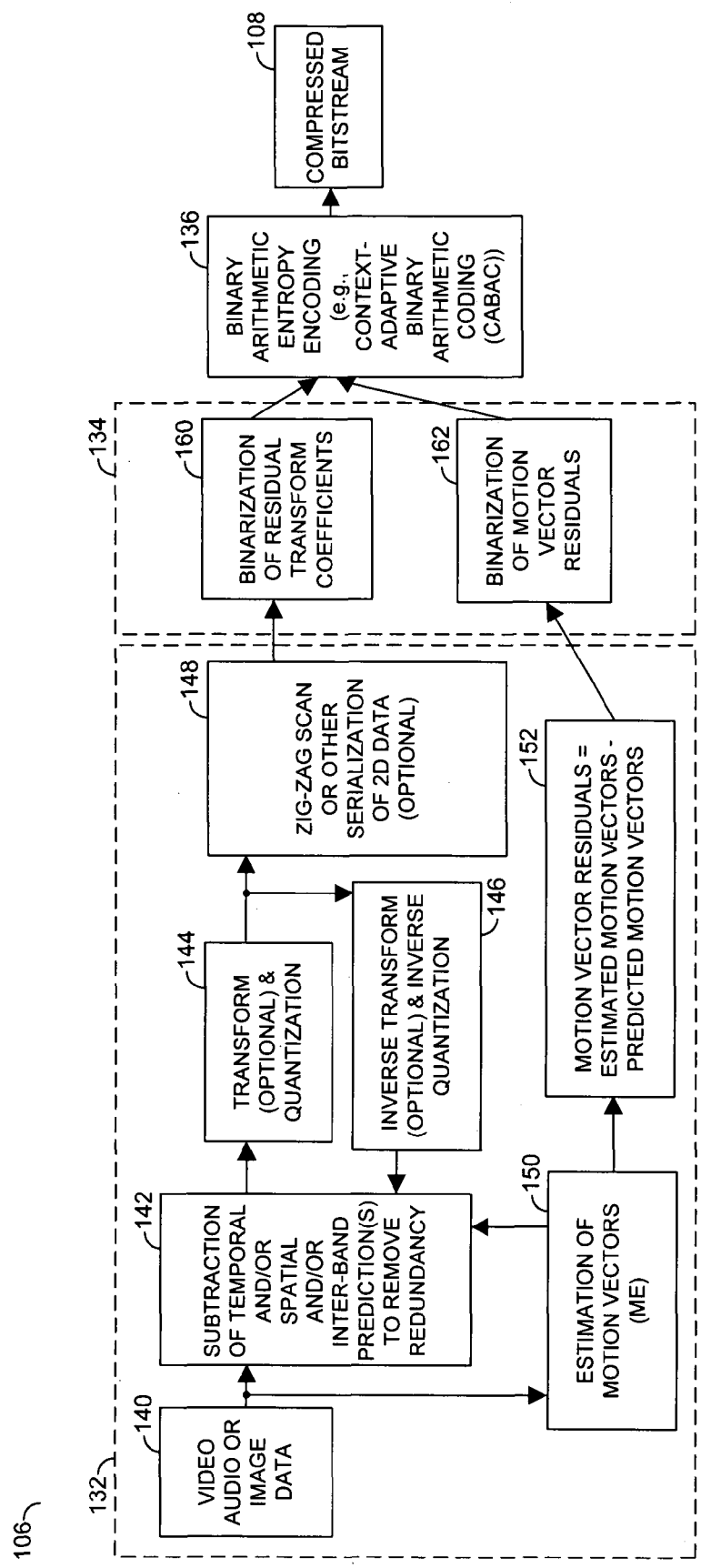
FIG. 5 is a block diagram of an encoder of FIG. 4.

Referring to FIG. 5, a block diagram of an encoder 106 is shown in accordance with a preferred embodiment of the present invention. The encoder 106 may be configured to encode video, audio, and/or image data. The encoder 106 may be compliant with the H.264/MPEG4-AVC video encoding standard. The encoder 106 generally comprises a block (or circuit) 132, a block (or circuit) 134 and a block (or circuit) 136. The block 132 may be implemented as a general processing circuit. The block 134 may be implemented as a binarization processing circuit. The block 136 may be implemented as an encoding circuit. In one example, the circuit 136 may be configured to perform binary adaptive entropy encoding (e.g., context-adaptive binary arithmetic coding or CABAC).

The circuit 132 may have (i) an input that may receive video, audio and/or image data, (ii) a first output that may present residual transform coefficients generated in response to the video, audio and/or image data, and (iii) a second output the may present motion vector residuals generated in response to the video, audio and/or image data. The residual transform coefficients and the motion vector residuals may be present to a first and a second input of the circuit 134, respectively. The circuit 134 may be configured to binarize the residual transform coefficients and the motion vector residuals for presentation to the encoding circuit 136. The encoding circuit 136 may be configured to generate the compressed bitstream 108 in response to the binarized residual transform coefficients and the motion vector residuals.

The circuit 132 may comprise a block (or circuit) 140, a block (or circuit) 142, a block (or circuit) 144, a block (or circuit) 146, a block (or circuit) 148, a block (or circuit) 150 and a block (or circuit) 152. The block 140 may receive video, audio and/or image data. The block 142 may perform subtraction of temporal and/or spatial and/or inter-band prediction(s) to remove redundancy (e.g., motion estimation, motion compensation, intra prediction, etc.). The block 144 may perform transformation (e.g., 4×4 integer transform, discrete cosine transform (DCT), etc.) and quantization functions. The block 144 may be an optional block not implemented for every application. The block 146 may perform inverse transformation and inverse quantization and delay functions. The block 146 may be an optional block not implemented for every application. In general, the block 146 may be configured to undo the transformation and/or quantization operations of the block 144. The block 148 may perform zig-zag scan or other serialization of two dimensional data (e.g., images). The block 148 may be an optional block not implemented for every application. The block 148 may present the residual transform coefficients to the block 134. The block 150 may perform estimation of motion vectors. The block 150 may present an output to the block 142 and to the block 152.

The block 152 generally calculates motion vector residuals. The block 152 may be configured to present the motion vector residuals to the block 134. The motion vector residuals may be determined by a difference between an estimated motion vector and a predicted motion vector. Motion vectors for neighboring blocks, macroblocks, partitions, etc. may be highly correlated. As such, each motion vector may be predicted from vectors of nearby, previously encoded/decoded and reconstructed macroblocks (or other partitions). A predicted motion vector may be formed using previous determined motion vectors. A motion vector difference (MVD) between the current motion vector and the predicted vector may be encoded and transmitted. The formation of a predicted motion vector generally depends upon the motion compensation block size and the availability of nearby (adjacent) blocks above, diagonally above, to the right, and to the left of the current macroblock or sub-block.

The block 134 may comprise a block (or circuit) 160 and a block (or circuit) 162. The block 160 may perform binarization of the residual transform coefficients. The block 162 may perform binarization of the motion vector residuals. The blocks 160 and 162 may be configured to present the binarized residual transform coefficients and binarized motion vector residuals to the block 136. The blocks 132, 136 and 160 may be implemented with conventional techniques known to those of ordinary skill in the art.

The block 162 may be configured to configured to generate a binarized representation of the motion vector residuals received from the block 132. The binarized representation of the motion vector residuals generally comprises (i) a binarized representation of an absolute value of each motion vector residual and (ii) a binarized representation of a sign of the motion vector residual when the motion vector residual has a non-zero value. The block 162 may be further configured to place the binarized representation of the sign immediately following (e.g., at the end of) the binarized representation of the absolute value of the motion vector residual. In one example, the block 162 may be configured to binarize the motion vector residuals via the implementation of Exponential Golomb (or Exp-Golomb) codes.

Figure 6:
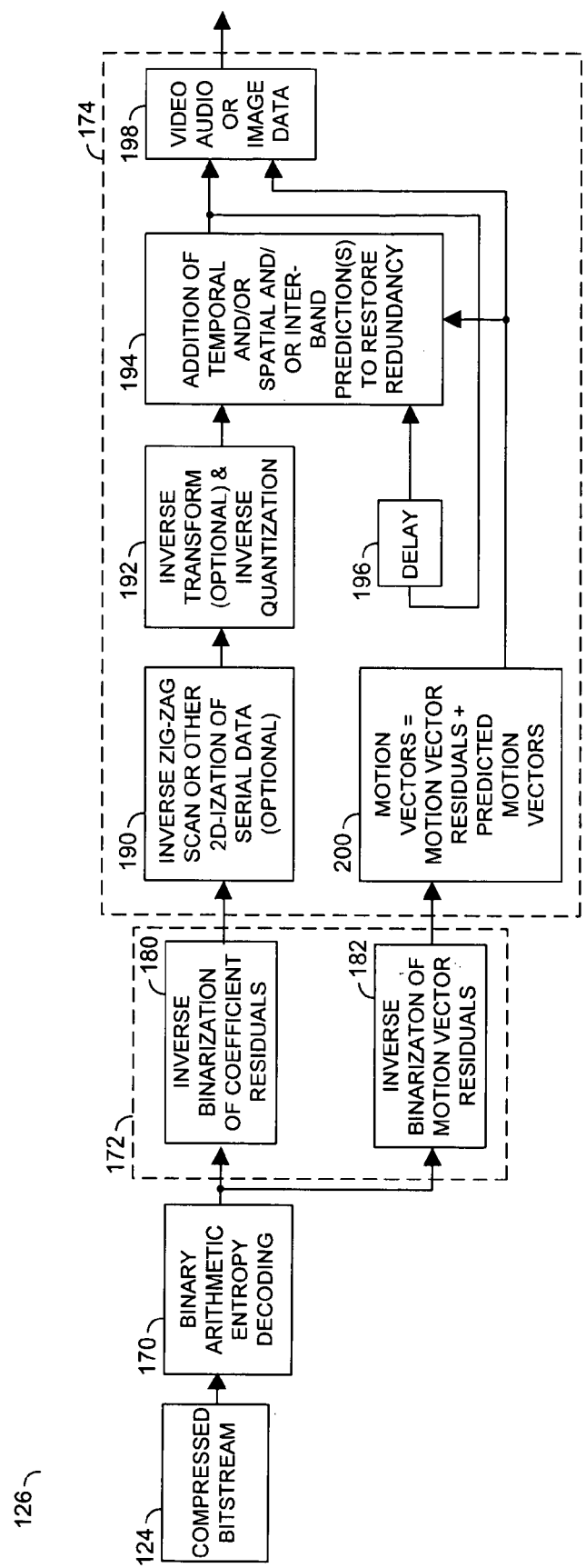
FIG. 6 is a block diagram of a decoder of FIG. 4.

Referring to FIG. 6, a block diagram of a decoder 126 is shown in accordance with a preferred embodiment of the present invention. The decoder 126 may be configured to decode video, audio, and/or image data. The decoder 126 may be compliant with the H.264/MPEG4-AVC video encoding standard. The decoder 126 generally comprises a block (or circuit) 170, a block (or circuit) 172 and a block (or circuit) 174. The block 170 may perform binary arithmetic entropy decoding on the compressed bitstream 124. The block 170 may present an output to the block 172. The block 172 generally performs inverse binarization of transform coefficient residuals and the motion vector residuals. The block 172 generally presents the recovered transform coefficient residuals and motion vector residuals to the block 174. The block 174 generally reconstructs the video, audio, and/or image data from the transform coefficient residuals and motion vector residuals.

The block 172 generally comprises a block (or circuit) 180 and a block (or circuit) 182. The block 180 may be implemented as an inverse binarization circuit for reconstructing transform coefficient residuals. The block 182 may be implemented as an inverse binarization circuit for reconstructing motion vector residuals data. The blocks 180 and 182 are generally configured to reverse the process(es) employed by the encoder that generated the compressed bitstream 124.

The block 174 generally comprises a block (or circuit) 190, a block (or circuit) 192, a block (or circuit) 194, a block (or circuit) 196, a block (or circuit) 198 and a block (or circuit) 200). The block 190 may receive the transform coefficient residuals from the block 172. The block 190 generally performs an inverse zig-zag scan or other deserialization (e.g., two dimensional characterization of serial data). The block 190 is an optional block that may not be implemented in every application. The block 192 generally performs inverse transformation (e.g., inverse 4×4 integer transform, inverse discrete cosine transform (IDCT), etc.) and an inverse quantization operations. The block 192 is an optional block that may not be implemented in every application. The block 194 generally performs addition of temporal and/or spatial and/or inter-band prediction(s) (e.g., motion compensation, inter prediction, intra prediction, etc.) to restore redundancy. The block 196 generally presents a delay from an output of the block 194 to a second input to the block 194. The delay provided by the block 196 generally provides temporal information upon which reconstruction may be based. The block 196 may be configured, in one example, to store one or more previously decoded frames. The stored frames may be used as prediction data for future (e.g., subsequent) frames. The block 194 generally reconstructs the video, audio and/or image data in response to the coefficients and motion vectors reconstructed from the compressed bitstream. The block 200 generally reconstructs the motion vectors by summing motion vector residuals received from the block 172 with predicted motion vectors determined from the reconstructed video, audio and/or image data.

Figure 7:
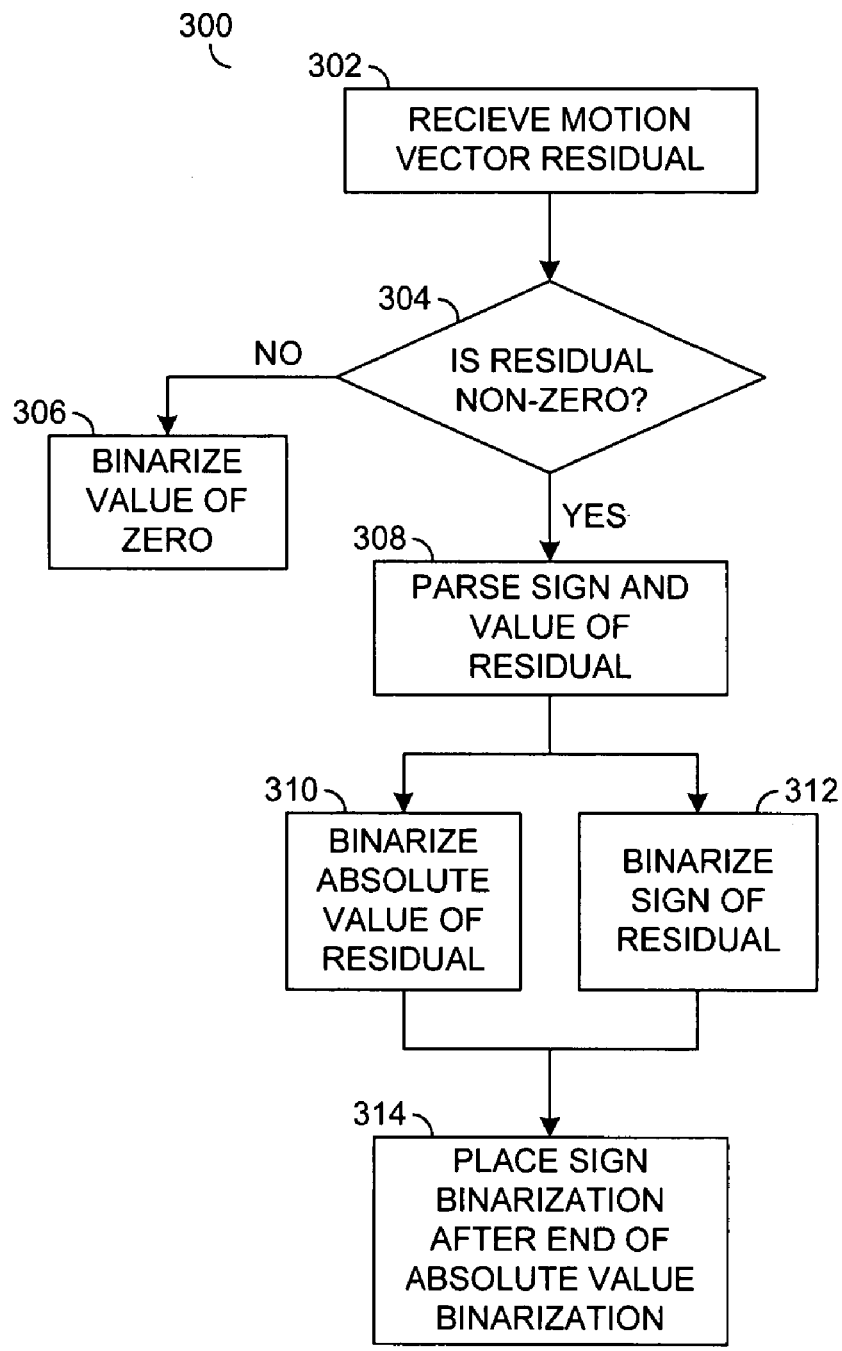
FIG. 7 is a flow diagram illustrating a binarization operation in accordance with a preferred embodiment of the present invention.

Referring to FIG. 7, a flow diagram 300 illustrating an example binarization operation in accordance with a preferred embodiment of the present invention is shown. For each motion vector residual received (e.g., the block 302), a determination is generally made whether the motion vector residual is non-zero (e.g., the block 304). When the motion vector residual is not non-zero (e.g., substantially equal to zero), only the absolute value of the motion vector residual (e.g., zero) is binarized (e.g., the block 306). When the motion vector residual is non-zero, the motion vector is generally parsed into a sign portion and an absolute value portion (e.g., the block 308). The absolute value portion is binarized (e.g., the block 310), the sign portion is binarized (e.g., the block 312), and the binarized sign portion is placed after the end of the binarized absolute value portion (e.g., the block 314).

Figure 8:
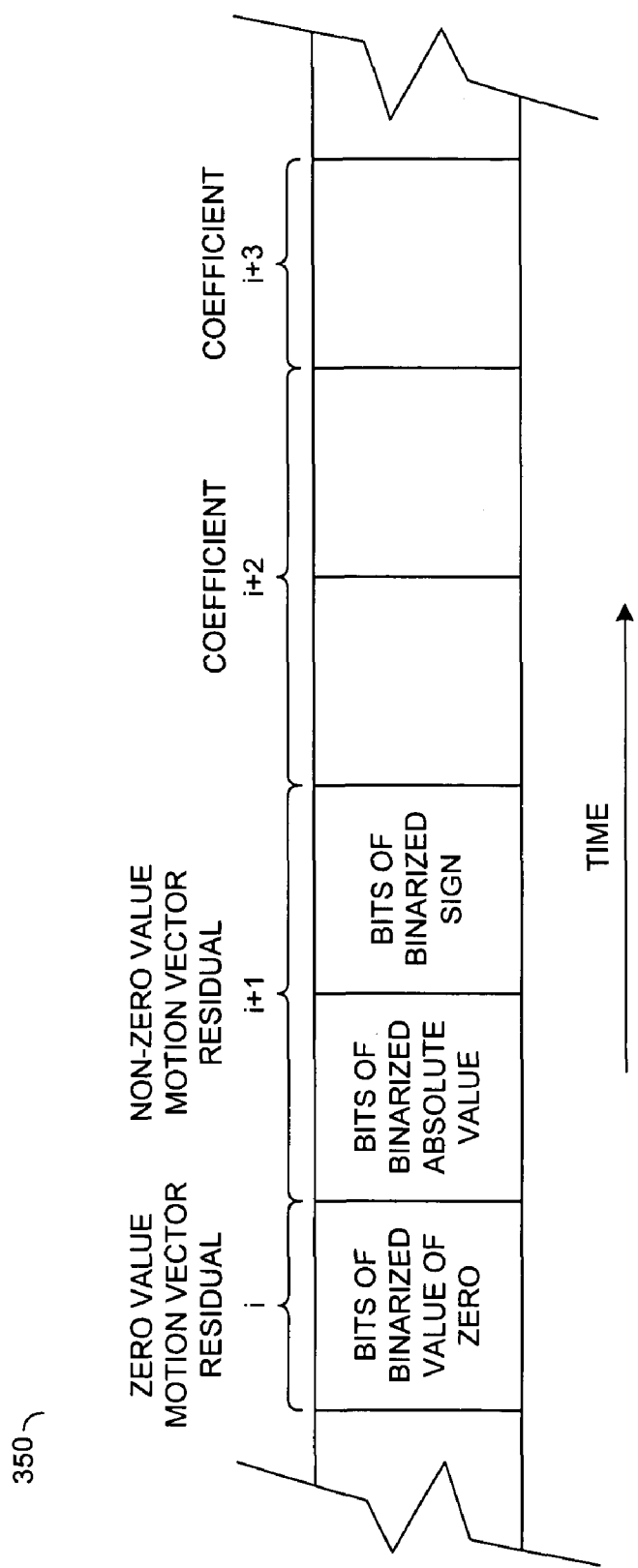
FIG. 8 is a diagram illustrating an example bitstream in accordance with the present invention.

Referring to FIG. 8, a diagram is shown illustrating an example bitstream 350 in accordance with a preferred embodiment of the present invention. The bitstream 350 is generally shown from an earlier time (e.g., left side) to a later time (e.g., right side). When a motion vector residual (e.g., i) has a value substantially equal to zero, the binarized value of zero is presented in the bitstream. When a motion vector residual (e.g., i+1) has a non-zero value, the binarized absolute value of the motion vector is presented first in the bitstream immediately followed by the binarized value for the sign of the motion vector. Subsequent motion vector residuals (or coefficients) are generally treated similarly (e.g., coefficients i+2, i+3, etc.).

As used herein, the term "simultaneously" is meant to describe events that share some common time period but the term is not meant to be limited to events that begin at the same point in time, end at the same point in time, or have the same duration.

The functions performed by the flow diagrams of FIGS. 6 and 7 may be implemented using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art(s).

The present invention may also be implemented by the preparation of ASICs, ASSPs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first processing circuit configured to generate one or more motion vector residuals in response to one or more macroblocks of an input signal; and
   a second processing circuit configured to convert between (i) the motion vector residual and (ii) a binarized representation of the motion vector residual, wherein (a) the binarized representation of the motion vector residual comprises (i) a binarized representation of an absolute value of the motion vector residual and (ii) a binarized representation of a sign of the motion vector residual when the motion vector residual has a non-zero value and (b) the binarized representation of the motion vector residual comprises a binarized representation of zero without a binarized representation of a sign of the motion vector residual when the motion vector residual has a value substantially equal to zero, wherein the binarized representation of the sign is located after an end of the binarized representation of the absolute value of the motion vector residual.

2. The apparatus according to claim 1, wherein said second processing circuit is implemented in a decoder.

3. The apparatus according to claim 1, wherein said first and said second processing circuits comprise an encoder.

4. The apparatus according to claim 1, wherein said apparatus comprises an H.264 compliant encoder.

5. The apparatus according to claim 1, wherein said second circuit is configured to generate said binarized representation according to an exponent Golomb binarization.

6. The apparatus according to claim 1, wherein:
   said second circuit is further configured to convert between (i) residual transform coefficients and (ii) a binarized representation of said residual transform coefficients.

7. The apparatus according to claim 6, further comprising:
   an encoding circuit configured to generate a compressed bitstream in response to said binarized representation of said motion vector residual and a binarized representation of residual transform coefficients.

8. The apparatus according to claim 7, wherein:
   said encoding circuit comprises a binary arithmetic entropy encoding circuit.

9. The apparatus according to claim 7, wherein:
   said encoding circuit is configured to perform context-adaptive binary arithmetic coding (CABAC).

10. An apparatus comprising:
    means for generating a motion vector residual in response to one or more macroblocks of an input signal; and
    means for converting between (i) the motion vector residual and (ii) a binarized representation of the motion vector residual, wherein (a) the binarized representation of the motion vector residual comprises (i) a binarized representation of an absolute value of the motion vector residual and (ii) a binarized representation of a sign of the motion vector residual when the motion vector residual has a non-zero value and (b) the binarized representation of the motion vector residual comprises a binarized representation of zero without a binarized representation of a sign of the motion vector residual when the motion vector residual has a value substantially actual to zero, wherein the binarized representation of the sign is located after an end of the binarized representation of the absolute value of the motion vector residual.

11. A method for presenting a motion vector difference to a binary arithmetic encoder comprising the steps of:
    (A) generating a motion vector residual in response to one or more macroblocks of an input signal;
    (B) converting between (i) the motion vector residual and (ii) a binarized representation of the motion vector residual, wherein (a) the binarized representation of the motion vector residual comprises (i) a binarized representation of an absolute value of the motion vector residual and (ii) a binarized representation of a sign of the motion vector residual when the motion vector residual has a non-zero value and (b) the binarized representation of the motion vector residual comprises a binarized representation of zero without a binarized representation of a sign of the motion vector residual when the motion vector residual has a value substantially equal to zero, wherein the binarized representation of the sign is located after an end of the binarized representation of the absolute value of the motion vector residual.

12. The method according to claim 11, wherein the step (B) further comprises:
    generating said binarized representation of said motion vector residuals from a compressed bitstream.

13. The method according to claim 11, wherein the step (B) further comprises:
    generating a compressed bitstream in response to said binarized representation of said motion vector residuals.

14. The method according to claim 13, wherein said compressed bitstream comprises an H.264 compliant bitstream.

15. The method according to claim 11, wherein the step (B) further comprises:
    generating said binarized representation according to an exponent Golomb binarization.

16. The method according to claim 11, wherein the step (B) further comprises:
    converting between (i) residual transform coefficients and (ii) a binarized representation of said residual transform coefficients.

17. The method according to claim 16, further comprising:
    generating a compressed bitstream in response to said binarized representation of said motion vector residual and said binarized representation of residual transform coefficients.

18. The apparatus according to claim 17, wherein:
    said bitstream comprises a binary arithmetic entropy encoded bitstream.

19. The apparatus according to claim 17, wherein:
    said bitstream is encoded according to context-adaptive binary arithmetic coding (CABAC).

20. The method according to claim 11, wherein the steps (A) and (B) are performed according to computer executable instructions.

* * * * *